UNITED STATES PATENT OFFICE.

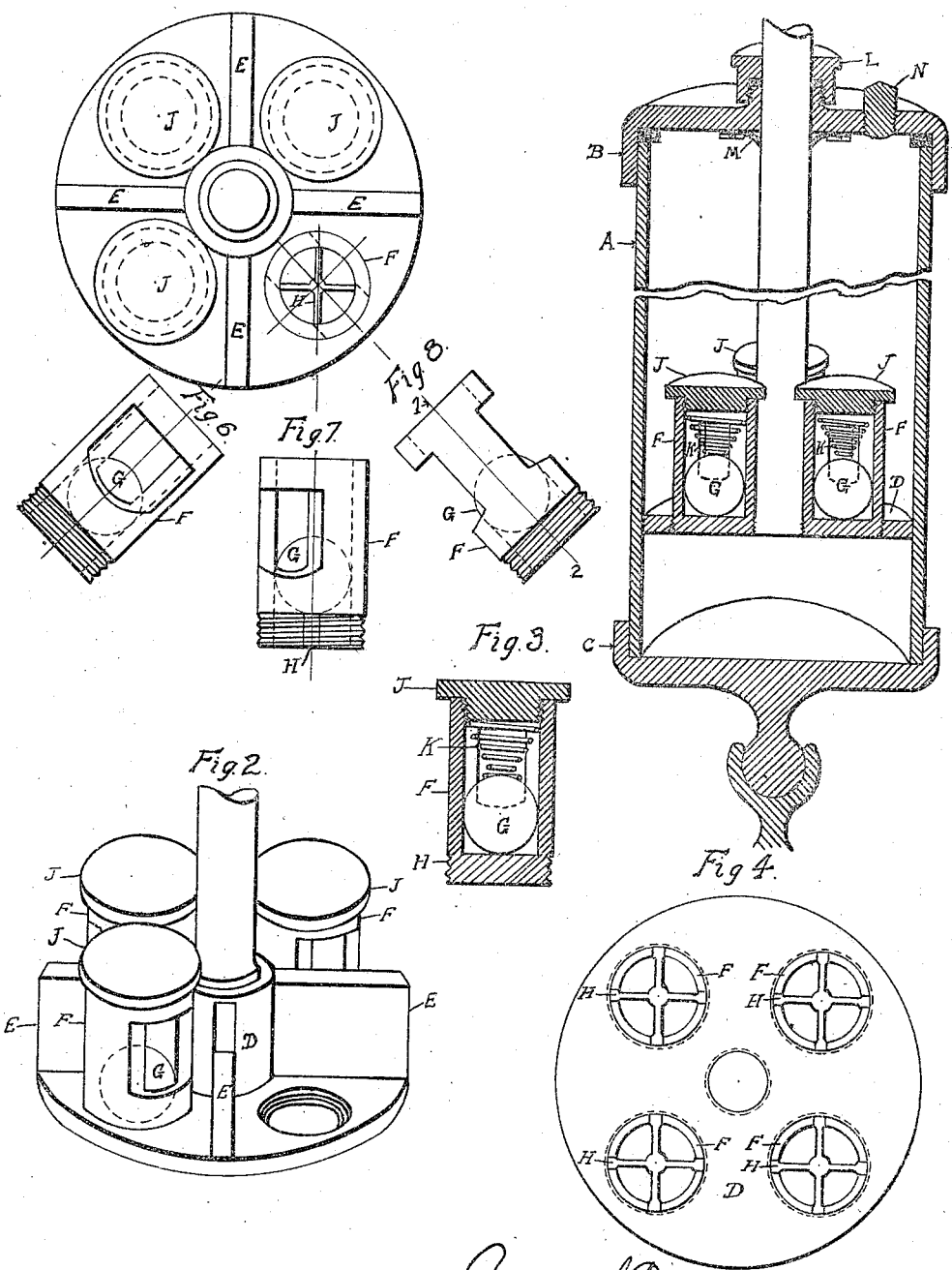

JAMES S. MADDEN, OF CHICAGO, ILLINOIS.

SHOCK-ABSORBER.

1,261,255.    Specification of Letters Patent.    Patented Apr. 2, 1918.

Application filed August 3, 1917. Serial No. 184,215.

*To all whom it may concern:*

Be it known that I, JAMES S. MADDEN, a citizen of the United States, residing at Chicago, in the county of Cook and State of Illinois, have invented a new and useful Shock-Absorber, of which the following is a specification.

My invention relates to a new and original combination of elements and mechanical actions for controlling the resiliency of vehicle springs; and the object of that combination is to provide a method of minimizing and neutralizing the recoil and shock inseparable from the uncontrolled action of springs on wheeled vehicles.

I attain this object by the mechanism illustrated in the accompanying drawing in which—

Figure 1 is a vertical section taken through the center of the entire device, with the exception of the upper portion of the plunger rod which ends in a ball and socket or universal joint.

Fig. 2 is a perspective view of the plunger showing the construction of the braces or baffle-plates and valves with one valve omitted to better illustrate construction and setting.

Fig. 3 is a sectional view of one of the valves taken along the line 1—2.

Fig. 4 is a bottom view of the plunger showing the location and method of retention of the valves in the plunger and the radial or cross-shaped form of the valve seat.

Fig. 5 is a top view of the plunger and its nest of valves with its radial braces or baffle-plates separating them.

Figs. 6, 7 and 8 are merely different constructional views of one of the valves in its setting in the plunger.

Similar letters refer to similar parts throughout the several views.

A. is a cylinder filled with oil or other liquid, hermetically sealed with caps B. and C; the lower one C. being fitted with a ball and socket or universal joint for attachment to the axle of a vehicle.

In the cylinder is fitted the plunger D. with plunger rod extending upward through the top cap B. and ending in a ball and socket or universal joint for attachment to the cross-bar, or the upper part of the frame of a vehicle immediately over the axle.

The upper face of the plunger D. is cross-sectioned by braces E. E. E. E. centering in the plunger rod and set at right angles to form four equal divisions or spaces; in each of which are placed valve cages F. F. F. F. screw-set into openings in the plunger D. as shown in the bottom view Fig. 4.

These valve cages are small brass cylinders—as shown in cross section Fig. 3—fitted with steel ball valves G. G. G. G. which rest upon radial or cross-shaped seats H. H. H. H. and held in place by screw caps J. J. J. J. and springs K. K. K. K.

These valve cages have openings cut into their opposite sides, the lower edges of these openings being slightly above the level of the diameters of the balls of the valves when resting on the valve seats.

The top cap B. is fitted with a stuffing box and gland L. through which the plunger rod works—a leather washer M. on the under side of the cap assisting the stuffing box in retaining the oil or liquid—and a pipe plug N. closing a vent used for filling and emptying the cylinder.

This device is intended to be attached to those parts of the axle of an automobile or other spring-fitted vehicle between and in close proximity to the springs; and its operation is described as follows:

The downward or closing motion of the springs of the vehicle forces the plunger down into the cylinder. The consequent compression of the oil on the under side of the plunger forces the steel balls of the valves upward permitting the oil to flow freely through the valve seats and the openings in the valve cages; the braces acting as baffle plates for diverting the current of the oil in an upward direction and reducing the churning effect of its passage through the openings.

The upward or opening motion of the springs draws the plunger upward in the cylinder with the consequent flow of the oil in the opposite direction, which, together with the action of the top cap springs, forces the steel balls to the bottoms of the valve cages. The steel balls in these positions fitting the valve cages so closely as to permit the oil to pass through only in a thin stream, arrest the upward movement of the plunger and check the recoil of the springs, thus preventing the throwing motion which always accompanies a recoil.

It is also claimed for this device that while it does not check the closing motion of the springs, it arrests it in such a manner as to produce a cushioned effect in the vehicle when striking any obstacle, or a depression in the road; and that by its immediate checking and slowly releasing the recoil of the springs, it prevents that sudden jolting or tossing effect of an unchecked recoil.

It is also claimed for this device that it not only conduces to the comfort of riding in the vehicle by preventing the jar and strain which results from uncontrolled springs, but it materially adds to the durability of both springs and vehicle.

I therefore claim:

1. The new and original combination of an oil filled cylinder with plunger rod and plunger; the plunger being fitted with radial right angle braces to strengthen and steady its action and to act as baffle plates; and with ball valves screw-set on its upper side in the sections formed by the right angle braces.

2. The new and original combination of an oil filled cylinder with plunger rod and plunger, the upper side of the plunger being fitted with radial right angled braces and ball valves screw-set in the sections formed by the braces; the ball valves having screw caps and springs to control the action of the balls of the valves by which the flow of the oil through the valve cages is regulated and controlled.

3. The new and original combination of an oil filled cylinder with plunger rod and plunger acting therein, with right angled braces on the upper side of the plunger to act as baffle plates, and perforated valve cages fitted with ball valves, screw caps and springs, and radial or cross-shaped valve seats screw-set in the spaces between the braces or baffle plates; the construction of these valve cages regulating and controlling the action of the plunger through the oil.

4. The new and original combination of an oil filled cylinder hermetically sealed and fitted with a plunger rod and plunger acting therein, said plunger carrying on its upper side radial braces or baffle plates and valves comprising valve cages with openings at opposite sides, ball valves acting therein and resting on radial or cross-shaped valve seats and held in place by screw caps and springs all substantially as set forth and for the purpose specified.

JAMES S. MADDEN.

Witnesses:
RULEL J. BROWN,
JAMES W. MADDEN.